March 15, 1966 R. OLSHAUSEN 3,240,447
VEHICLE CONTROL SYSTEM
Original Filed Jan. 10, 1962 4 Sheets-Sheet 1

INVENTOR.
RICHARD OLSHAUSEN
BY
ATTORNEY

INVENTOR.
RICHARD OLSHAUSEN
BY
ATTORNEY

INVENTOR.
RICHARD OLSHAUSEN
BY
Allan Rothenberg
ATTORNEY

United States Patent Office 3,240,447
Patented Mar. 15, 1966

3,240,447
VEHICLE CONTROL SYSTEM
Richard Olshausen, Sunset Beach, Calif., assignor to
North American Aviation, Inc.
Original application Jan. 10, 1962, Ser. No. 165,362.
Divided and this application Mar. 30, 1965, Ser. No.
454,231
7 Claims. (Cl. 244—77)

This is a divisional application of copending application Serial No. 165,362 filed January 10, 1962.

This invention relates to a vehicle control system and more particularly to a gust alleviator for a longitudinal control system for vehicles adapted for travel through a fluid medium.

The development of high performance aircraft has led to the requirements of automatic flight control devices to aid or augment the pilot in providing suitable control of such aircraft. For example, the design of high performance aircraft flying over a wide range of flight conditions (e.g., combinations of speed and altitude) often display poor handling qualities and poor flight stability at certain flight conditions, making difficult the pilot's task of aircraft control. The difficulty of such task has been much improved in the art by means of closed-loop sensing and control devices used to improve aircraft flight stability through operation of the aircraft control surfaces. Improved longitudinal control of such high performance aircraft has also included the use of a set of auxiliary movable surfaces called canard control surfaces, located forward of the center of gravity of the aircraft. Such surfaces are usually small, thereby providing little aerodynamic lift, the chief function of such surfaces being to effect changes in the pitching moment of the aircraft, as defined by the product of the small lift effect of the canard and the distance between the center of such lift force of such surface and the aircraft center of gravity. The lift force, and hence a change in pitching moment, is effected by rotation of the canard surface relative to the relative wind vector, thereby changing the aerodynamic angle of attack of the canard surface.

Closed-loop auxiliary control means have also been employed to improve (e.g., reduce) the gust response of aircraft. A small local atmospheric anomaly or local air mass moving relative to the main air mass is often referred to as a gust. A gust disturbance or externally applied vertical acceleration or disturbance of aircraft is produced whenever the aircraft flies into or through such an atmospheric anomaly. Vertical gusts, producing vertical or normal accelerations, are of particular concern in the design of aircraft for the reason that airframe designs for maximum payload and range employ a minimum safety factor or load factor. Hence, repeated exposure of the airframe to vertical gusts may weaken the airframe or cause its limit load factor (e.g., structural limitations) to be exceeded. Such gust response is particularly significant in the case of high performance aircraft wherein the speeds at which such gusts are encountered induce more severe disturbances or greater vertical accelerations. Further, even in the event that such structural limits are not seriously approached by the aircraft response to such gusts, considerations of pilot or passenger comfort might deem such aircraft response to be undesirable.

Such considerations of pilot comfort are particularly significant in the case of high-performance aircraft wherein the pilot's station is significantly forward of the aircraft center of gravity, due to the size of such aircraft and other factors, thereby causing the pilot to experience large pitching moments upon aircraft response to gust inputs.

In prior art high-gain closed-loop pitch control systems or stability augmenters, only limited pitch acceleration occurs in response to vertical gusts or external normal accelerations. However, normal acceleration response of the aircraft to such gusts is not necessarily so minimized, being more a function of the airframe open-loop response.

In prior art closed-loop gust alleviation systems for conventional aircraft having elevators aft-mounted to the empennage thereof, pitching moments are associated with the control action of the gust alleviation system, due to the aft location of such elevators relative to both the aircraft center of gravity and the main lifting force of the wings. In other words, minimum normal acceleration response is accomplished only at the expense of suffering pitching accelerations associated with such control action. Further, the action of such a gust alleviator, where concurrently operable with an aircraft manual control mode, tends to resist or attenuate the effects of pilot control. In other words, practical control system design has heretofore represented compromise between the desired airframe response to pilot inputs and the desired gust alleviation function.

An alternative approach to such design compromise has been the use of a high pass filter in the gust alleviation system whereby low frequency pilot inputs such as slow or small trim changes are not compromised by low frequency gust alleviator response. An obvious disadvantage of such an arrangement, however, is the inability of the system to compensate or alleviate low frequency gust loads which are often of appreciable magnitudes.

Another alternative approach to such design compromise has been the use of a cut-out switch in cooperation with the pilot's controls, whereby the gust alleviator system is made inoperative upon the pilot engaging his controls and is restored to operability upon the pilot disengaging his controls. An obvious disadvantage of this arrangement is that periods of inoperability may occur during which performance of the system function may be desired.

It is, therefore, a broad object of this invention to provide means for combining a gust alleviation system and pilot inputs in a flight control system without compromising the system response to either of them.

True gust alleviation requires a change in lift without a change in pitching moment or pitching attitude. Accordingly, the device of this invention, in one embodiment thereof, comprises a control system for an aircraft of a canard configuration, and having an elevon or main control channel and a canard or auxiliary control channel, whereby a compensatory change in lift is effected in response to a gust input, without attendant changes in pitching moment. There is provided a gust angle-of-attack computer, feedback means for operatively connecting the output of the computer to the two control channels, means for combining a pilot input signal with the feedback means to one of said channels, and adjustable gain means inserted in between the input to said other channel and the output from said computer for equalizing aircraft pitching moments induced by said channels in response to the output from the computer. Such adjustable gain means is adjusted by drive means as a function of the product of the aircraft pitch acceleration and the output from the computer in such a sense as to reduce such product to a minimum.

A significant feature of the described arrangement resides in the gust angle-of-attack $\alpha g$ computer which provides a feedback control signal representative of and proportional to the angle of attack increment $\alpha g$ caused by gust motion. This control signal is so computed as to be substantially independent of angle-of-attack $\alpha$ increments due to maneuvers or commanded vehicle motion so that both gust alleviations and pilot control may be provided in one system without compromise of either.

By means of the above described arrangement, the combined effect of the elevon and canard channels in response to a gust angle-of-attack $\alpha g$ is a net change in lift tending to compromise such gust without an attendant pitching moment response. In other words, the incremental pitching moment induced by the canard control surface action in response to a gust is used to balance the gust-response induced pitching moment resulting from the primary control surface action. Further, the combined response of the two channels to a command or pilot input applied to one of them is to preserve the desired normal acceleration or load factor caused by the pilot-induced maneuver, as a result of the aircraft pitch-response to such pilot input. Accordingly, it is an object of the subject invention to provide improved means for achieving gust alleviation.

It is another object of the subject invention to provide a gust alleviation system for vehicles having both forward and aft longitudinal controls.

It is yet another object of the subject invention to provide gust alleviation means which induces a minimum pitching acceleration response.

It is a further object of the subject invention to provide self-optimizing gain means for one channel of a closed-loop control system having an elevon and canard control channels for equalizing the pitching moments thereof.

It is still a further object of the subject invention to provide improved means for effecting control of a vehicle in combination with a gust alleviator system.

Yet another object of the subject invention is to provide dual channel control means for controlling the response of one mode of a multiple response mode vehicle while minimizing the response of a second mode of such vehicle to said control means.

These and other objects of the invention will become apparent from the following description taken together with the accompanying drawings in which.

In the drawings like reference characters refer to like parts.

Figure 1:
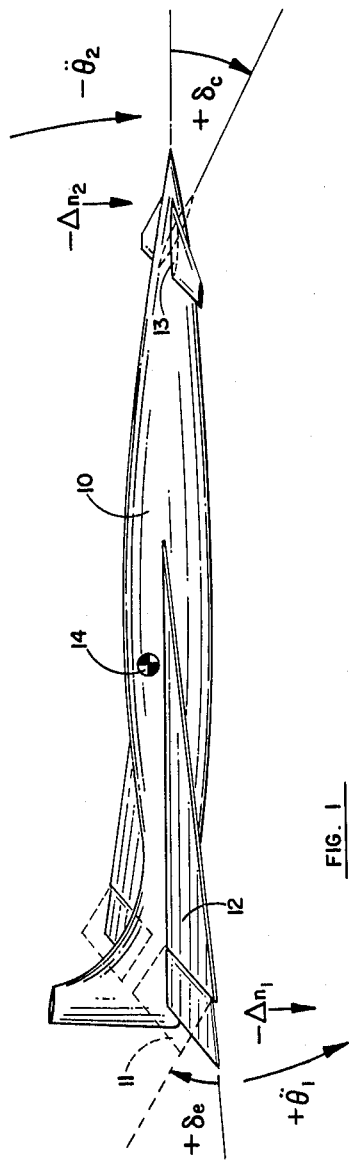
FIG. 1 is an illustration of an airframe having a canard configuration demonstrating the like sense of incremental lift forces and opposing sense of incremental pitching moments produced by deflection of both the elevon and canard control surfaces in a like sense.

Referring to FIG. 1, there is illustrated a high-performance aircraft 10 of a canard configuration, having an elevon control surface 11 located at the trailing-edge of each of the two main aerodynamic lift surfaces or wings 12, and further having a small, all-movable (e.g., rotatable) canard surface 13 on either side of the nose or forward end of the vehicle.

It is apparent that a like clockwise angular deflection of each of control surfaces 11 and 13 (as shown by the dotted lines in FIG. 1) will induce an increase in aerodynamic pressure upon the upper surface of each, resulting in an initial downward force or incremental normal acceleration, $-\Delta n$.

It is also to be noted from the situation of elevon 11 aft of the center of gravity point 14 of the airframe, that the downward normal acceleration $(-\Delta n)$ at the elevon will produce a counter-clockwise pitching moment or pitching acceleration $(+\ddot{\theta})$ of the airframe, as shown in FIG. 1. If the action of the deflected elevon were not compensated, then the counter-clockwise (nose-up) rotation of the airframe would increase the angle of attack of the main lifting surface or wing, as to cause an increase of the lift vector in the positive sense. Such increased lift by the wing would occur at some time delay after the deflection and negative lift of elevon 11 as shown in FIG. 1.

It is further to be noted from the situation of canard 13 forward of the center of gravity point 14 of the airframe, that the downward normal acceleration $(-\Delta n)$ at the canard will produce a clockwise pitching moment or acceleration $(-\ddot{\theta})$ of the airframe, as shown in FIG. 1. In other words, a deflection of like sense of both the elevon and canard surfaces from a trim position (condition of zero net steady-state pitching moments about the airframe) will result in changes in lift having a common sense or direction, and changes in component moments of mutually opposite sense. Further, if such pitching moments are made equal in magnitude as to result in a zero net pitching moment or zero change in pitch trim, then the net lift effect from the combined deflections of the canard and elevon control surfaces will be due to the effect of the control surfaces alone. In other words, the sense of such incremental change in lift will be due to the change in the local angle of attack of the control surfaces and not due to an appreciable change in the angle of attack of the wing.

The relative pitching moment provided by a given control surface, say the canard 13 of FIG. 1, is a function of the area thereof, its local angle of attack, and the moment arm or dimension of the center of pressure thereof from the aircraft center of gravity 14. Because the geometry of the control surface area and the station or installation point thereat relative to the fuselage are predetermined by design, only the control surface angle of attack can be controlled during flight, by varying the angular deflection of such control surface. In rotating the elevons and canards in unison in a common direction to effect a change of lift for gust alleviation purposes, the net airframe pitching moment may be reduced by controlling the extent of the canard deflection relative to the elevon deflection of like sense. In other words, by controlling the relative gain of the canard control channel relative to the elevon control channel, in response to a gust signal computer, the incremental pitching moment induced by the canards in response to such computer may be made to equalize the pitching moments similarly induced by the elevons, as shown in FIG. 2.

Figure 2:
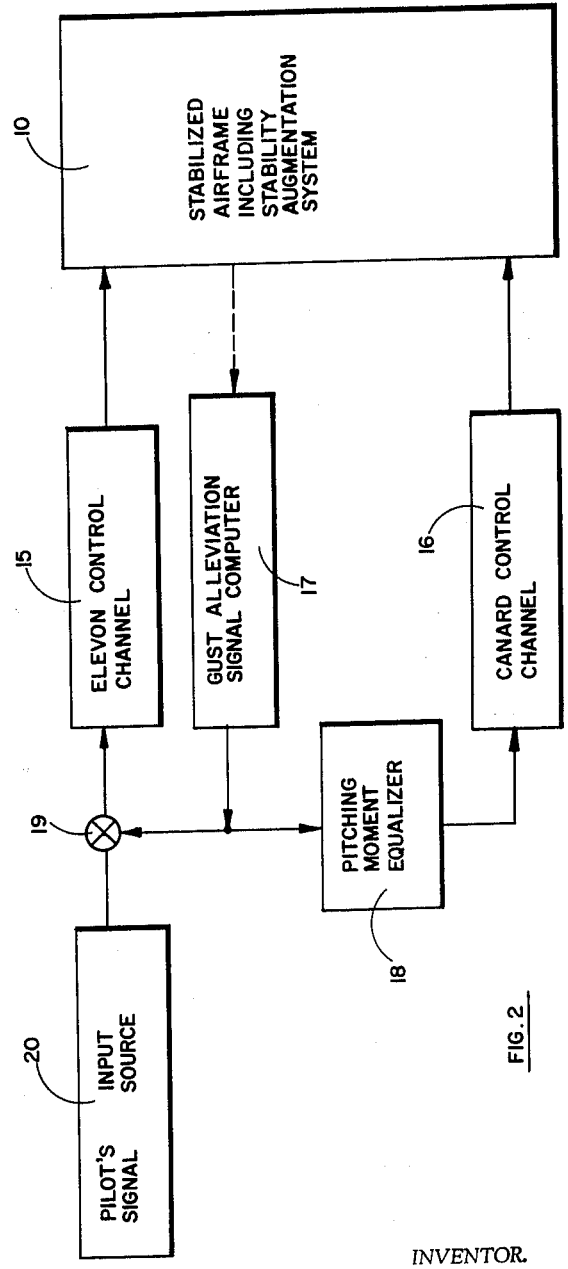
FIG. 2 is a functional block diagram of a system employing the principles of the invention.

Referring to FIG. 2, there is illustrated a functional block diagram of a system employing the principles of the invention. There is provided an elevon or main control channel 15 and canard or auxiliary control channel 16 for control of a stabilized airframe 10. Such airframe may include, for example, a stability augmentation system in combination with the control surfaces of airframe 10 comprising means well-known to those skilled in the art and constituting no aspect of the subject invention.

There is further provided a gust alleviation signal computer 17 for computing a signal indicative of a gust angle-of-attack $\alpha g$ (e.g., increments of angle of attack due to gust motion) by means to be more particularly described hereinafter. This signal is substantially independent of other increments of angle of attack such as that due to commanded maneuvers. The output of computer 17 is applied to channels 15 and 16 in such sense as to produce an initial lift vector increment upon aircraft 10 which opposes the lift vector produced by a gust angle-of-attack $\alpha g$ to which the aircraft may be subjected. Pitching moment equalizer 18 is interposed between the output from computer 17 and the input to canard control channel 16, to adjust the gain of the canard channel in such a fashion as to equalize or offset the pitching moments induced by the elevon channel in response to computer 17. The means by which such function is accomplished will be more particularly described hereinafter.

There is also provided input summing means 19 for applying a control signal from a pilot's input signal source 20 or the like to elevon control channel 15 in combination with the input thereto from computer 17. It will be understood that the sense of the signal provided by computer 17 as applied to control channel 15 (and also channel 16) is such as to produce an acceleration of the aircraft in opposition to a gust-induced acceleration. This signal is combined with the pilot's input signal which itself is of the sense chosen by the pilot for a particular maneuver.

In normal operation of the device of FIG. 2, the response of computer 17 to a gust angle-of-attack to which the aircraft has been subjected produces an output signal indicative of such gust. The response of control channels 15 and 16 to such signal is to cause control surface deflections, resulting in changes of lift of like sense (as to oppose the sense of the gust) and changes of pitching moments of mutually opposite sense. Equalizer 18 responds to a net pitching moment in the presence of a gust to adjust the pitching moments induced by the canard channel in such a fashion as to equalize those induced by the elevon channel in response to computer 17. In this way, minimum net pitching moment results from the response of the system in FIG. 2 to a gust-induced change of angle of attack. When a maneuver command or input signal is fed from input source 20 to input summing means 19 to effect a pitching moment by means of biasing elevon channel 15, the output of the gust alleviation signal computer 17 is zero if no gust has occurred. Thus, the craft is allowed to maneuver in the normal manner. Equalizer 18 responds to a gust angle-of-attack in the presence of a pitching moment to adjust the gain of the canard channel in such a fashion as to reduce gust-induced pitching moment. In other words, the concurrent operation of the gust alleviation system of FIG. 2 during a pilot-induced pitch maneuver tends to minimize the load factor induced by a gust during the maneuver, but does not comprise the aircraft pitch response to such maneuver. Hence, it is to be seen that the system of FIG. 2 provides for pilot control and automatic gust alleviation in a flight control system without comprising the system response of either of them.

It is to be understood that each channel comprises a conventional control servo for stablizing the aircraft during flight in response to control signals from a pilot, or autopilot, as well as the gust alleviation system of the present invention. For simplicity, only the actuators, control surfaces and position pickoffs of such control servos are described in detail with reference to FIG. 3 in order to complete the closed loop for automatic gust alleviation. A typical control servo for an aircraft is disclosed in United States Patent No. 2,985,409 which discloses a more fundamental gust alleviation system in which vertical acceleration $N_z$ of the center of gravity is computed and a signal proportional thereto transmitted to a flap-control channel for altering lift in the required sense to counteract vertical acceleration sensed by accelerometers A and B. A separate signal is transmitted to an elevator-control channel to counteract angular or pitch acceleration.

In considering means for mechanizing the gust computer 17 of FIG. 2, it is to be noted that an aircraft is maneuvered by pitching the aircraft to change the angle of attack of the main lifting surface (e.g., the wing), to provide a change of lift for acceleration in the desired direction. An angle of attack sensor cannot distinguish between changes in angle of attack due to maneuvering and those due to gusts. Hence, the output signal from such sensor is indicative of both of these conditions, as they occur.

The output signal $\alpha_T$ from an angle of attack sensor mounted upon a rigid airframe is indicative of the following contributing effects:

$$\alpha_T = \alpha_B + \alpha - \frac{L}{V}\dot{\theta} \quad (1)$$

where $\alpha$=vehicle angle-of-attack relative to inertial velocity vector in still air
$\alpha_g$=vehicle angle-of-attack increment due to a gust
$L$=distance in feet between the C.G. and the angle-of-attack sensor location (the sense of "L" being positive for locations forward of the C.G.)
$v$=vehicle velocity in feet per second
$\dot{\theta}$=vehicle pitch rate in radians per second as determined by a pitch rate sensor The desired control signal indicative of gust angle-of-attack is represented by rearranging Equation 1 as follows:

$$\alpha_g = \alpha_T - \left[\alpha - \frac{L}{V}\dot{\theta}\right] \quad (2)$$

Thus it will be seen that computation of the term $\alpha_g$ will provide a feedback control signal indicating angle-of-attack increments due to gusts only, with such signal being substantially independent of other components and increments of angle-of-attack since such other increments and components are subtracted from $\alpha_T$. The angle of attack term, $\alpha$, due to the inertial velocity vector can be further expressed as follows:

$$\alpha = \int (\dot{\theta} - \frac{57.3g}{V}N_z)\,dt \quad (3)$$

where:

57.3 is a conversion factor if $\alpha$ and $\theta$ are in units of degrees instead of radians.
$g$=gravitational constant, and
$N_z$=normal acceleration of the vehicle in inertial space However, the mechanization of the above integration can be approximated by a lag network having a large time-constant, $T_1$.

Another approximation for $\alpha$ can be obtained by noting the expression for the aircraft angle of attack response to deflections of the elevator or elevon, $$\alpha(s) = \theta(s)F(s) \quad (4)$$

where $F(s)$ is of the first order lag form, $$\frac{K_2}{T_2s+1}$$

and K is a gain constant, and $T_2$ is a time constant in seconds, and $s$ the Laplace operator. Therefore, two alternative means are described for mechanizing a computer to obtain a signal proportional to $\alpha$, the angle of attack relative to the inertial velocity vector. The first employs a time lag network or integration means in conjunction with the mechanization of the integrand of Equation 3:

$$\alpha = \frac{T_1}{T_1s+1}\left[\dot{\theta} - \frac{57.3g}{V}N_z\right] \quad (5)$$

where $T_1$ is chosen approximately equal to 10 seconds to closely approximate integration over the frequency range of interest.

The second means employs a time lag network or integration means in series with the output from a pitch rate signal source.

$$\alpha(s) = \dot{\theta}(s)\frac{K_1}{T_2s+1} \quad (6)$$

Accordingly, the desired control signal indicative of a gust angle-of-attack, $\alpha_g$, may be obtained from a device employing an angle-of-attack detector to provide the signal $\alpha_T$ of Equation 2 by either of two mechanizations indicated by Equations 5 and 6 to provide a signal indicative of $\alpha$, and additional signal sources to provide the remaining term $$\frac{L\theta}{V}$$

of Equation 2. The use of an angle-of-attack detector of the aerodynamic vane-type or other types well known in the art requires careful calibration and maintenance of such sensor for accurate results. Where it is not desired to use aerodynamic sensor means for detecting angle of attack, inertial sensors may be employed instead. For example, the rigid body equation for vertical acceleration $N_Z$ sensed at some location on the fuselage by a normal accelerometer can be resolved to provide a signal indicative of $\alpha_g$ as follows:

$$\alpha_g = \frac{N}{N_\alpha} - \frac{L}{57.3gN_\alpha}\ddot{\theta}\frac{N\dot{\theta}}{N_\alpha}\dot{\theta} - \frac{N\delta_e}{N_\alpha}\delta_e - \frac{N\delta_c}{N_\alpha}\delta_c - \alpha \quad (7)$$

where: $L$=the distance between the C.G. and the normal accelerometer location. $N_Z$=rigid body normal acceleration of the airframe detected by normal accelerometer and $N\ddot{\theta}$, $N\dot{\theta}$, $N\delta_e$, $N\delta_c$ and $N\alpha$ are the partial derivatives of $N_Z$ with respect to the indicated subscript quantities. A normal accelerometer (e.g., a lineal accelerometer having its sensitive axis aligned parallel to the airframe plane of symmetry and perpendicular to the fuselage reference line) can be employed to detect $N_Z$, a pitch angular accelerometer (e.g., sensitive axis parallel to the airframe pitch axis or perpendicular to the plane of symmetry) to detect $\ddot{\theta}$, a pitch rate gyro to detect $\dot{\theta}$, a position pickoff for each of the control channels of FIG. 2, $\delta_e$ and $\delta_c$. These are all conventional instruments. The mechanization of either of Equations 5 and 6 may be employed to compute the term, $\alpha$. In practice, some of the terms in Equation 7 may be neglected. However, they can all be easily measured by means well known to those skilled in the art, as indicated above.

An alternative method for computing the gust angle-of-attack $\alpha_g$, is to employ an angular accelerometer to measure pitching acceleration, and mechanize the solution to the rigid body pitch acceleration equation for $\alpha_g$:

$$\alpha_g = \frac{\ddot{\theta}}{K_\alpha} - \frac{K\dot{\theta}}{K_\alpha}\dot{\theta} - \frac{K\delta_e}{K_\alpha}\delta_e - \frac{K\delta_c}{K_\alpha}\delta_c - \frac{K\dot{\alpha}}{K_\alpha}\dot{\alpha} - \alpha \quad (8)$$

where $K\alpha$, $K\dot{\theta}$, $K\delta_e$, $K\delta_c$ and $K\dot{\alpha}$ are partial derivatives of $\ddot{\theta}$ with respect to the indicated subscript quantities. An angular accelerometer can be employed to detect $\ddot{\theta}$, a pitch rate gyro to detect $\dot{\theta}$, and a position pick-off for each of the control channels of FIG. 2 for $\delta_0$ and $\delta_c$. The term $$\frac{K\dot{\alpha}}{K_\alpha}\dot{\alpha}$$

is normally negligibly small. The mechanization for either of Equations 5 and 6 may be employed to compute the term, $\alpha$.

Figure 3:
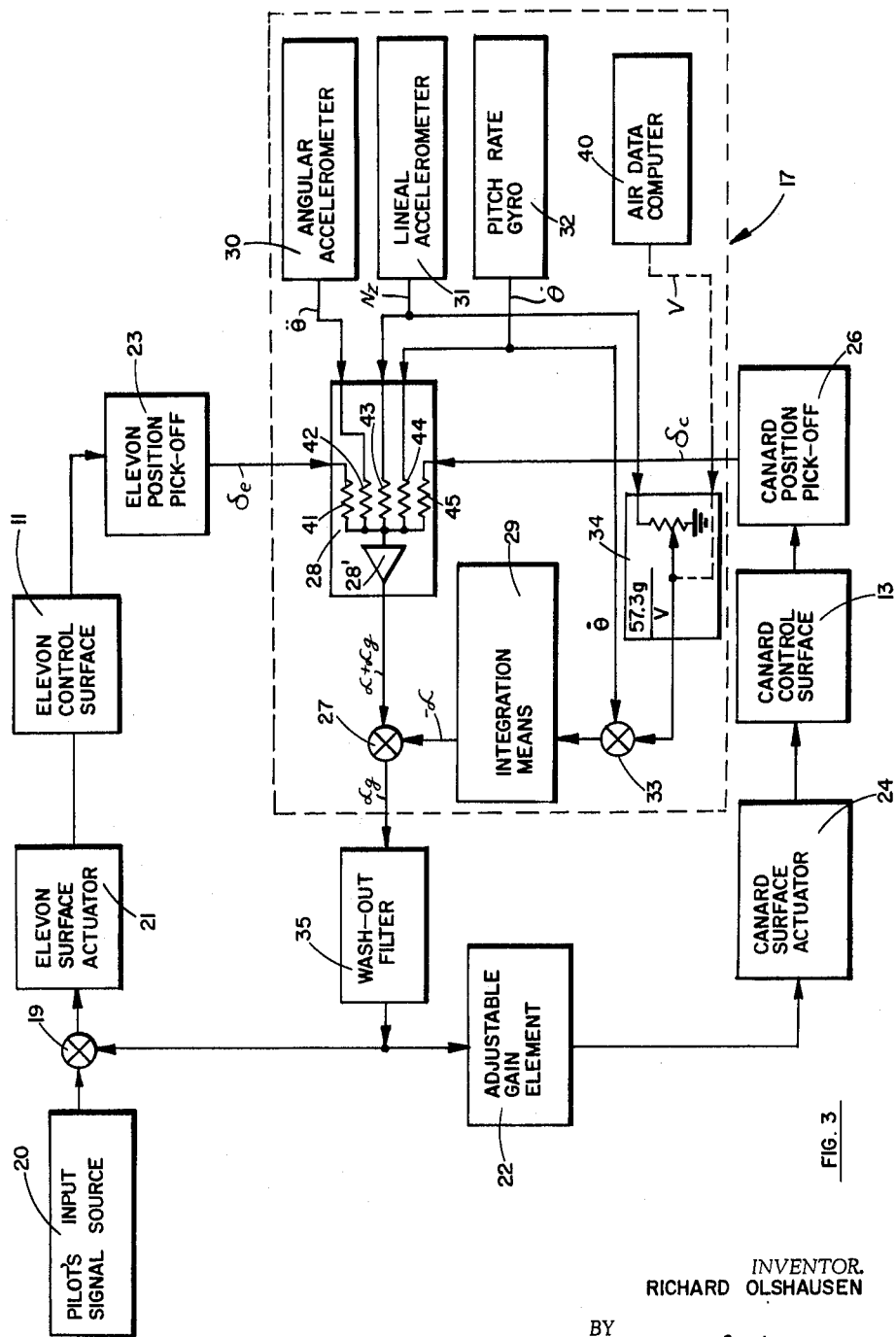
FIG. 3 is a functional block diagram of an exemplary embodiment of the device of FIG. 2 further illustrating the gust alleviation signal computer of FIG. 2.

Referring to FIG. 3 there is illustrated a block diagram of an exemplary embodiment of the gust alleviation signal computer of FIG. 2, mechanizing the relationship of Equations 5 and 7. There is provided an elevon control channel and a canard control channel. The elevon control channel is comprised of an elevon surface actuator 21 operatively connected to drive elevon control surface 11, and an elevon position pick-off 23 for providing a signal indicative of the angular position of the elevon 11 relative to the airframe upon which it is installed. The canard channel is comprised of a canard surface actuator 24 operatively connected to drive a canard control surface 13, and a canard position pick-off 26 for providing a signal indicative of the angular position of the canard 13 relative to the airframe upon which it is installed. The actuators 21 and 24 may be electromechanical screw jacks or electrohydraulic actuators or like means well known in the art for providing a source of mechanical motion in response to an input signal. The position pick-offs 23 and 26 may be electrically excited potentiometers or like transducer means well known in the art for providing an output signal indicative of mechanical motion.

There is further a gust alleviation signal computer 17 for providing to the elevon and canard control channels a signal indicative of gust angle-of-attack. Computer 17 is comprised of a comparison means 27 responsively connected for comparing the outputs from a summing means 28 and a high frequency integration means 29. Such summing means may be comprised of a summing amplifier 28' having a plurality of input summing resistors 41, 42, 43, 44 and 45 corresponding to the plurality of signals to be summed, and commonly connected to the amplifier input, each resistor being connected in series with a mutually exclusive one of the several sources of input signals. Integration means 29 may be comprised of an ordinary R-C integrating network or other means well known in the art for obtaining an output signal indicative of the time integral of an input signal. An R-C integrating network of the type which may be employed herein is described, for example, in FIG. 1.5 (e) at page 13 of "Electronic Analog Computers" (second edition), McGraw-Hill (1956).

Summing means 28 is responsively connected to the signal outputs from each of pick-off elements 23 and 26, a pitch angular accelerometer 30, and a normal accelerometer 31. Suitable gain levels are used at the inputs to summing means 28 to achieve the gains indicated by the coefficients in Equation 7, and shown in FIG. 3. Such gain levels are established by the value of the input summing resistor used in conjunction with an associated input signal, as is well known in the art, being more fully explained for example at page 163 of "Electronic Analog Computers" (second edition) McGraw-Hill (1956). The input of integration means 29 is responsively connected to a second comparison means 33 for comparing the outputs of pitch rate gyro 32 and lineal accelerometer 31 for providing a signal indicative of the difference therebetween. A gain element or signal attenuation means 34 is interposed between accelerometer 31 and comparison means 33 to provide the gain coefficient for the $N_Z$ signal indicated by Equation 5. It is recalled that the attenuation or modification of the gain of the $N_Z$ signal described in Equation 5 is an inverse function of the forward air speed or velocity V of the aircraft. Therefore, a mechanization suitable for all flight conditions of the aircraft flight regime employs an inverse function generator or potentiometer 34 driven by a velocity signal from a conventional air data computer 40 or other means well-known in the art for producing a signal indicative of vehicle velocity. Function potentiometers are well known in the art and are described, for example, at pages 321–329 of "Electronic Analog Computers" (second edition) McGraw-Hill (1956). The other gains used in the mechanization of Equation 7 are not critical (although each of them could be similarly adjusted automatically by means of the same air data computer, if desired). For instance, the two gain terms $$\frac{N\delta_c}{N_a} \text{ and } \frac{N\delta_e}{N_a}$$

(as determined by the value of input resistors 41 and 45 respectively of the summing network) are each ratios of two airframe response gain terms, which terms are both functions of flight condition and tend to be compensating. In other words, the ratios of such terms do not necessarily vary critically with flight conditions; a fixed gain for each can be found which represents a design compromise for a particular aircraft application. Further, the gain levels of the $\ddot{\theta}$, $\dot{\theta}$ and $\delta_c$ signals (determined by resistors 42, 44 and 45, respectively) are usually so low that either the gain adjustments required for a change in flight condition can be ignored, or possibly such signal inputs themselves may not be required in a practical mechanization.

The output of computer 17 is fed to each of actuators 21 and 24. A signal wash-out device or filter 35 is interposed between the actuators and the output from computer 17 to prevent the transmission of D.-C. signals, while allowing the transmission of time-varying signals. The purpose of such function is to prevent the transmission of steady-state D.-C. signal components which would bias the trim signal condition of an aircraft flight control system which employs the device of the invention. Such filter has a transfer function $T_s/T_c+1$, where the time constant T is selected to be large enough (say, 10 seconds) as to allow the system to responds to low frequency gusts. The construction of such filter is well known to those skilled in the art, one form thereof being described, for example, as circuit 1.3 of Table 1, page 415 of "Electronic Analog Computers" (second edition), McGraw-Hill (1956).

A pitching moment equalizer or adjustable gain element 22 (to be more particularly described hereinafter) is interposed between the input from filter 35 and the input to canard actuator 24 to adjust the gain of the canard channel, whereby the net pitching moment response of the aircraft to the output from filter 35 is minimized. Input summing means 19 is provided for applying a control signal from a pilot's input source 20 to elevon actuator 21, in combination with the input thereto from filter 35.

In normal operation, the device of FIG. 3 functions similarly as the system illustrated in FIG. 2. The inputs from the control surface position pick-offs 23 and 26 to computer 17 together with the angular accelerometer and pitch rate gyro inputs, cancel that output component of lineal accelerometer 31 which is due to these sources and not due to a gust thus giving an $N_Z$ signal proportional to the total angle of attack ($\alpha - \alpha_g$). By using the signal from the integrating means 29 to subtract the angle of attack component $\alpha$ from the total angle of attack ($\alpha - \alpha_g$), a signal representing $\alpha_g$ is obtained; thereby minimizing the computer response to a normal flight maneuver or pilot induced change in load factor.

Figures 4, 5:
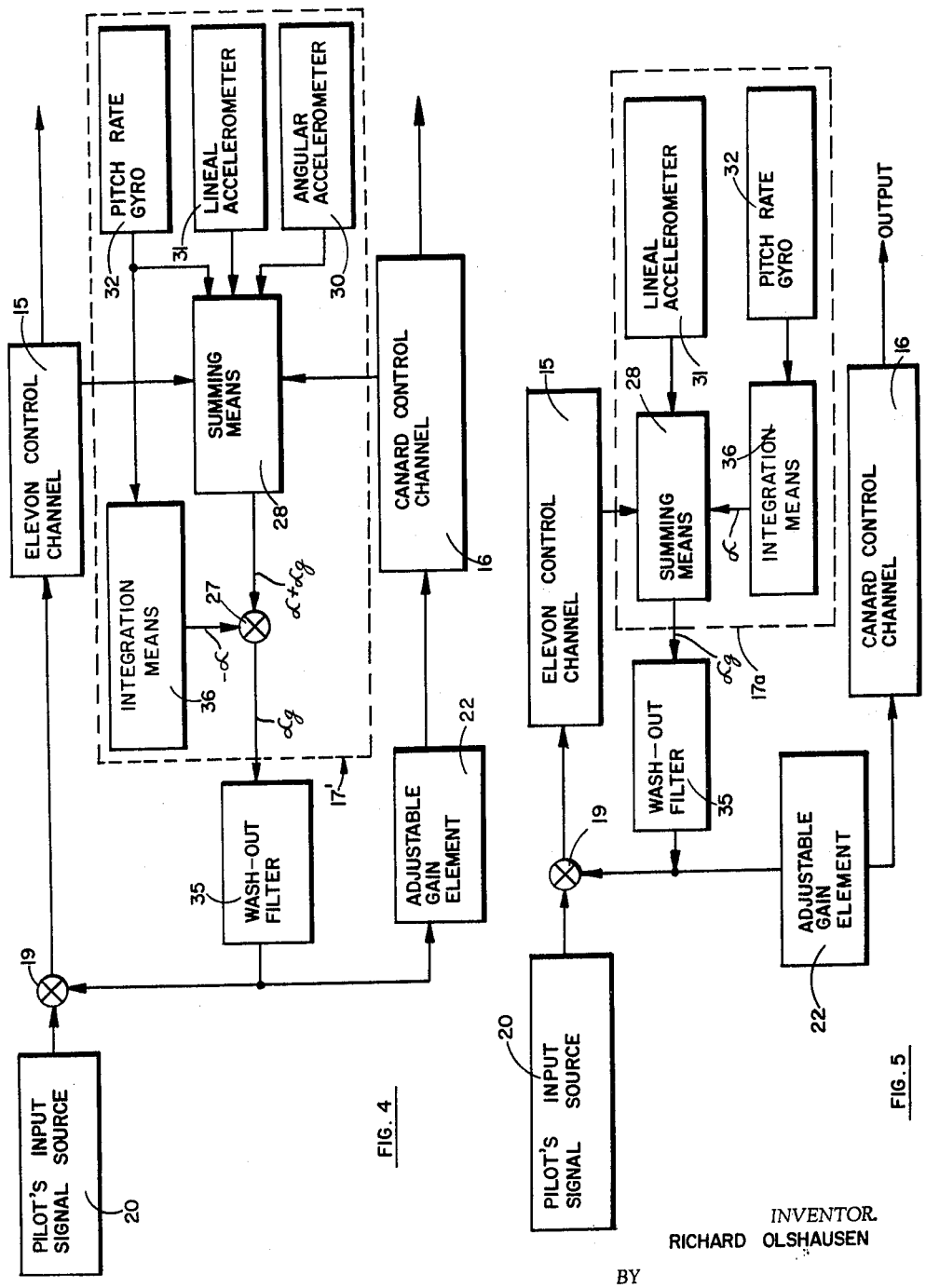
FIG. 4 is a functional block diagram of another exemplary embodiment of the device of FIG. 2, illustrating an alternate mechanization of the gust alleviation signal computer of FIG. 2.
FIG. 5 is a functional block diagram of a simplified mechanism of the embodiment of FIG. 4.

An alternate mechanization for computer 17 of FIG. 2 mechanizes the term $\alpha$ of Equation 7 in accordance with the approximate relationship described by Equation 6, as shown in FIG. 4.

Referring to FIG. 4, there is illustrated a functional block diagram of a second exemplary embodiment of the device of FIG. 2, illustrating an alternate mechanization of the gust alleviation signal computer of FIG. 2. There is provided an elevon control channel 15, canard control channel 16, gust signal computer 17, adjustable gain element 22, and input summing source 19, all arranged similarly as like referenced elements of FIGS. 2 and 3. In addition, a wash-out filter 35 is interposed between the output of computer 17′ and the input to elements 22 and 19.

Computer 17′ is comprised of comparison means 27 responsively connected for comparing the outputs from a summing means 28 and an integration network 36. Summing means 28 is responsively connected to the outputs from the control channels 15 and 16, and from each of an angular accelerometer 30, lineal accelerometer 31, and a pitch rate gyro 32. Suitable gain levels are used at the input to summing means 28 to achieve the gains indicated by the coefficients of Equation 7, in the manner hereinabove described in connection with the description of FIG. 3.

Integration network 36 may be comprised of an RC circuit or like means well known in the art for providing integration of the pitch rate signal with respect to time. Network 36 is responsively connected to the output of pitch rate gyro 32 to provide an output signal indicative of the relationship described by Equation 6. The time lag $T_2$ provided by network 36 is predetermined as a function of the type of aircraft employing the system, but will be on the order of about one-half second. The required sense of the integrated pitch rate signal at the output of network 36 is opposed to that of the pitch rate signal input to summing means 28 from gyro 32. Accordingly, the output of network 36 cannot be directly applied to the input of summing means 28, but is differentially combined with the output of summing means 28 by comparison means 27. Alternatively, an inverting amplifier could be used to invert the sense of the output from network 36, and apply the sense-inverted signal directly to the input of summing means 28.

Because the signal gain levels for the inputs to summing means 28 from each of the canard control channel 16, angular accelerometer 30 and pitch rate gyro 32 are usually relatively small, these inputs can be omitted without seriously sacrificing system performance, thereby effecting the simpler system shown in FIG. 5.

Referring to FIG. 5, there is illustrated a functional block diagram of a simplified mechanization of the embodiment of FIG. 4. There is provided an elevon control channel 15, canard control channel 16, gust alleviation computer 17a, adjustable gain element 22, input signal summing means 19, and wash-out filter 35, all arranged similarly as like referenced elements of FIG. 4.

Computer 17a is comprised of summing means 28 responsively connected to elevon control channel 15, normal accelerometer 31, and integration network 36. Integration network 36 is responsively connected to pitch rate gyro 32. Because only a single rate gyro-derived signal is used, rather than two rate gyro signals of opposite sense, comparison means 27 of FIG. 4 is not required. The sense of the output from pitch rate gyro 32 is chosen so that the output from network 36 may be applied directly to summing means 28.

The device of FIG. 5 operates similarly to the embodiment illustrated in FIGS. 2, 3 and 4 to provide a compensatory change in lift in response to a vertical gust, without compromising airframe response to pilot-induced pitching maneuvers. The desired minimum pitch response to gust inputs is accomplished by means of a preselected gain provided by the canard channel gain element 22. Such element may be comprised of a potentiometer or other means for adjusting the gain level of a signal input thereto. However, the preselected gain required may change as a function of flight condition (e.g., changes in speed, altitude, weight and weight distribution —effecting the C.G. point). Therefore, means is required for automatically and continuously adjusting gain element 22 to provide the proper gain. A system employing such a self-optimizing gain element is shown in FIG. 6.

Figure 6:
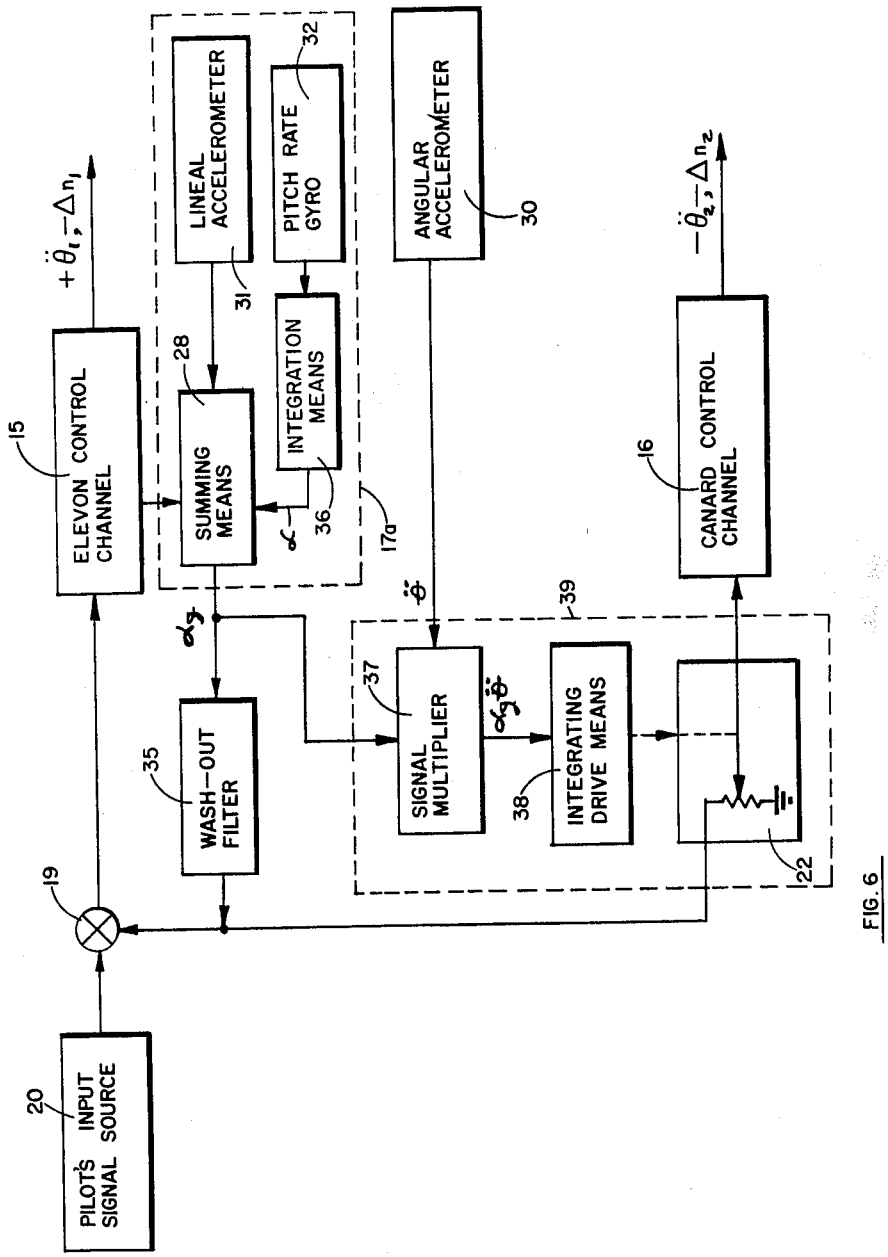
FIG. 6 is a functional block diagram of a rpeferred embodiment of the invention, incorporating a self-optimizing gain feature in the adjustable gain element of FIG. 5.

Referring to FIG. 6, there is illustrated a preferred embodiment of the invention, incorporating a self-optimizing gain feature in the adjustable gain element of FIG. 5. There is provided an elevon control channel 15, a canard control channel 16, a gust alleviator signal computer 17a, adjustable gain element 22, input summing means 19, and wash-out filter 35, all arranged substantially the same as like referenced elements of FIG. 5.

There is further provided a signal multiplier 37 responsively connected to both of computer 17a (which provides a signal indicative of a sensed condition $\alpha_g$), and an angular accelerometer 30 (which provides a signal indicative of a second sensed condition $\ddot{\theta}$). Such signal multiplier functions to provide an output signal which is a function of the product of the amplitudes of the two inputs thereto. Such a device is well known to those skilled in the art, being illustrated, for example, in FIG. 6.8 (a) on page 262 of "Electronic Analog Computers" (second edition), McGraw-Hill (1956). An integrating drive means or motor 38 is responsively connected to the output of multiplier 37 and arranged for driving adjustable gain element 22 at a rate indicative of the amplitude of the motor input. Hence, the combination of elements 22, 37 and 38 of FIG. 6 comprise a self-optimizing gain element 39.

In operation of the system of FIG. 6, motor 38 adjusts the gain of adjustable gain element 22 in such a sense or direction as to reduce the product $\alpha_g \ddot{\theta}$ toward zero or a null. If no gust is present (e.g., $\alpha_g$ approaches zero), then the product $\alpha_g \ddot{\theta}$ will be zero, thus providing no driving signal to motor 38. If, however, a gust signal occurs at the output of computer 17a, then the output signal from multiplier 37 will be zero only if the output $\theta$ from angular accelerometer 30 is zero. If, in the presence of a gust, angular acceleration $\theta$ is not zero (e.g., the gust alleviation system response is not optimum), then motor 38 adjusts gain element 22 in response to the drive signal from multiplier 37 so as to vary the gain of the canard channel, thereby reducing $\theta$ (and, hence, the product $\alpha_g \theta$) toward zero. If the motor should attempt to overdrive, then the difference between the pitching moment contributed by the elevon channel and that contributed by the canard channel will change sense or sign, reversing the sense of the product, $\alpha_g \theta$ or signal output from multiplier 37. Such change of sense of the output from element 37 will cause the motor to reverse and drive towards a signal null.

In this way, self-optimizing gain element 39 acts to continuously adjust and maintain a suitable gain ratio of canard channel gain to elevon channel gain. Such self-optimizing gain feature also tends to compensate for any loss of accuracy of computation suffered through the use of a simplified gust computer or through the use of compromise fixed gain coefficients in such computer. Further, the slow speed of the integrator motor assures smoothing or filtering of the multiplier response to random pilot-induced components of $\theta$ in the presence of a gust $\alpha_g$, whereby the product $\alpha_g \theta$ is minimized without compromising aircraft pitch maneuver response to pilot inputs. Hence, the system of FIG. 6 provides gust alleviation with minimum pitch response and without compromising airplane pitch maneuver performance under a wide range of flight conditions.

It will be readily appreciated that the combination of elements 37 and 38 to provide self-optimizing control of adjustable gain element 22 in the embodiment of FIG. 5 (as illustrated in FIG. 6) may be employed in each of the embodiments of FIGS. 3 and 4, if deemed desirable or necessary.

The described vehicle control mechanism, typical of a number of vehicles, operates in response to a control signal (from the computer) to effect at least two different vehicle responses including a normal acceleration and a pitching acceleration. The latter response is undesired in many situations. Accordingly, the described self-optimizing adjustment of gain in the auxiliary control channel is provided to reduce that component of the undesired response (pitch acceleration) which is induced by application of the control signal from the computer to the control mechanism. It is to be seen that the output of computer 17a provides a control signal indicative of a first sensed condition, $\alpha_g$; the output of angular accelerometer 30 provides a signal indicative of a second sensed condition $\theta$, and that elevon and canard control channels 15 and 16 comprise a control means having first and second control channels for a vehicle having several modes of response to a given control channel output. Self-optimizing gain element 39 is similarly seen to be comprised of multiplier 37 which is responsive to the first and second sensed conditions for providing a second control signal, and motor 38 and potentiometer 22 which comprise means responsive to the second control signal for reducing that component of the second sensed condition $\theta$ induced by vehicle response to the first control signal, $\alpha_g$.

While the device of the invention has been described in relation to an aircraft having an aft mounted wing and forward mounted or canard control surface, it is readily to be appreciated that the principles of the invention may be applied to an aircraft having a forward mounted wing and an aft mounted elevator control surface. In such an application the wing trailing edge flaps or other control surfaces would be employed for lift control. For example, the aileron control surfaces at the trailing edge of the wing would be employed in unison for lift control as well as differentially employed for roll control of the aircraft, while the elevators would be employed to provide pitching moment equalization. In other words, the elevon or main control channel of FIG. 2 would operate the control surfaces on the trailing edge of the wing (as in the canard configuration), and the canard or auxiliary channel would operate the elevators on the empennage assembly (the sense of the canard channel signals being determined as required for such application). Hence, the principles of the invention are equally applicable to both forward wing type aircraft and canard type aircraft.

Further, while the invention has been described in terms of an application to aircraft, it is to be understood that the device of the invention is equally applicable to the control of submarines or other vehicles adapted to travel through a fluid medium.

Thus, improved means has been described for providing vertical gust alleviation of a vehicle without compromising vehicle pitch maneuverability. Further, improved control means has been described for effecting control of a vehicle in response to a control signal indicative of a sensed condition, while minimizing vehicle response to a second sensed condition.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a longitudinal flight control system for an aircraft having a main control channel and an auxiliary control channel, input signal means including signal comparison means for applying a control signal to one of said channels; gust computing means comprising a high frequency integrator responsive to a pitch rate signal, and summing means responsive to a normal acceleration signal and responsively connected to said integrator; said channels being responsively connected to said computing means; a pitching moment equalizer interposed between the other of said channels and said gust computing means, said equalizer being comprised of a variable gain element, an integrating drive means responsively connected to a signal multiplier for varying the gain of said variable gain element, said multiplier being responsive to a signal indicative of the pitch acceleration of said aircraft and to said output of said computing means.

2. In a longitudinal flight control system for an aircraft having an elevon control channel and a canard control channel, input signal means for applying a control signal to one of said channels, computing means for providing a single output signal indicative of only gust-induced angle of attack, means for applying said output from said computing means to said channels for producing an elevon channel induced pitching moment and normal acceleration of opposite sense and like sense respectively relative to similar canard channel induced pitching moment and acceleration of said aircraft, and a gain element interposed between the output of said computer and the other of said channels for equalizing said moments as a function of the output of said computer, said gain element comprising a self-optimizing gain device further comprising an adjustable gain element, and integrating motor drive means responsively coupled to a signal multiplier for adjusting the gain of said adjustable gain element, said multiplier being responsive to a signal indicative of the pitching acceleration of said aircraft and to the output of said computing means.

3. The claimed device of claim 2, in which said computing means is comprised of signal integrating means having an output responsive to a pitch rate signal; and summing means responsive to said pitch rate signal, said integrating means, said control channels, a pitch acceleration signal and a normal accelerometer signal.

4. A gust alleviation system for an aircraft having a main control surface for impressing a pitching moment thereon and an auxiliary control surface for stabilization of said aircraft about its transverse axis, comprising means for producing a first electrical signal proportional to lineal acceleration normal to the longitudinal and transverse axes of said aircraft;

means for producing a second signal proportional to angular rate about said transverse axis;

means for producing a third electrical signal proportional to the position of said control surface;

computing means responsive to said first, second and third signals for producing a gust-alleviating control signal proportional to an angle-of-attack increment being experienced by said aircraft due to a gust;

a main control channel for positioning said main control surface in response to said input signal source;

means for translating said gust-alleviating control signal to said main control channel thereby producing a change of lift sufficiently to counteract normal acceleration due to gust;

an auxiliary control channel for positioning said auxiliary control surface in response to said gust-alleviating control signal; and adjustable-gain means for coupling said gust-alleviating control signal to said auxiliary control channel, comprising a variable gain element for continuously varying the gain ratio of the gust-alleviating control signal for the auxiliary control channel to the gust-alleviating control signal for the main control channel, including means for producing a fourth signal proportional to angular acceleration of said aircraft about its transverse axis, means responsive to said gust-alleviating control signal and to said fourth signal for providing an output signal which is a function of the product of the amplitude of the signals applied thereto, and integrating drive means for varying the gain of said adjustable gain means at a rate proportional to said output signal to reduce said output toward zero.

5. A gust-alleviating system as defined by claim 4 wherein said computing means comprises means for integrating said second signal and producing a fifth signal proportional to angle-of-attack, summing means responsive to said first, second, third and fourth signals for producing a sixth signal proportional to total angle-of-attack, and means for comparing said fifth and sixth signals to produce thereby said gust-alleviating angle-of-attack signal as a difference between said fifth and sixth signal.

6. In a control system for a vehicle having main and auxiliary control channels for controlling said vehicle relative to a predetermined axis thereof, the combination comprising means responsive to accelerations experienced by said vehicle in a direction normal to said axis for providing a control signal;

means for applying said control signal to both said control channels in a sense to cause said channels to effect moments about said axis of mutually opposite sense and translational accelerations of like sense in opposition to said experienced acceleration;

means for sensing angular acceleration of the vehicle about said axis; and means responsive to the product of the sensed angular acceleration and said control signal for varying the gain of said auxiliary control channel to cause said opposite sense moments to be of mutually equal magnitude.

7. A control system for a controlled element having a first and second sensed condition comprising signalling means for providing a feedback control signal indicative of said first sensed condition of said controlled element;

first and second control means responsive to said first means for controlling said first and second sensed conditions, said first control means being further responsive to a pilot input; and gain changing means comprising a multiplier responsive to said first and second sensed conditions for providing a gain control signal indicative of the product of said sensed conditions, and adjustable gain changing means for changing the gain of said second control means as a function of said product, whereby that component of said second sensed condition induced by controlled element response to said first control signal is reduced.

No references cited.

MILTON BUCHLER, *Primary Examiner.*

FERGUS S. MIDDLETON, *Examiner.*

UNITED STATES PATENT OFFICE
CERTIFICATE OF CORRECTION

Patent No. 3,240,447                          March 15, 1966

Richard Olshausen

It is hereby certified that error appears in the above numbered patent requiring correction and that the said Letters Patent should read as corrected below.

Column 6, equation (3) should appear as shown below instead of as in the patent:

$$\alpha_T = \alpha_g + \alpha - \frac{L}{V}\dot{\theta}$$

same column 6, equation (6) should appear as shown below instead of as in the patent:

$$\alpha(s) = \dot{\theta}(s)\frac{K_1}{T_2 s + 1}$$

column 7, equation (7) should appear as shown below instead of as in the patent:

$$g = \frac{N_z}{N\alpha} - \frac{L}{57.3 g N\alpha}\ddot{\theta} - \frac{N_{\dot{\theta}}}{N\alpha}\dot{\theta} - \frac{N_{\delta e}}{N\alpha}\delta e - \frac{N_{\delta c}}{N\alpha}\delta c - \alpha$$

Signed and sealed this 22nd day of July 1969.

(SEAL)
Attest:

EDWARD M. FLETCHER, JR.                      WILLIAM E. SCHUYLER, JR.
Attesting Officer                                Commissioner of Patents